United States Patent [19]

Raj et al.

[11] Patent Number: 4,575,102

[45] Date of Patent: Mar. 11, 1986

[54] COAXIAL, MULTIPLE-SHAFT FERROFLUID SEAL APPARATUS

[75] Inventors: Kuldip Raj, Merrimack; Hanumaiah L. Gowda, Nashua, both of N.H.

[73] Assignee: Ferrofluidics Corporation, Nashua, N.H.

[21] Appl. No.: 673,550

[22] Filed: Nov. 20, 1984

[51] Int. Cl.$^4$ .............................................. F16J 15/40
[52] U.S. Cl. ...................................... 277/80; 277/135
[58] Field of Search ................................. 277/80, 135

[56] References Cited

U.S. PATENT DOCUMENTS

| | | | |
|---|---|---|---|
| 3,740,060 | 6/1973 | Miskolczy et al. | 277/80 |
| 4,304,411 | 12/1981 | Wilcock | 277/135 |
| 4,506,895 | 3/1985 | Raj et al. | 277/80 |
| 4,527,805 | 7/1985 | Gowda et al. | 277/135 |

*Primary Examiner*—Robert I. Smith
*Attorney, Agent, or Firm*—Richard P. Crowley

[57] ABSTRACT

A compact, coaxial multiple-shaft ferrofluid seal apparatus which comprises: a housing; a central shaft and magnetically permeable coaxial shafts about the central shaft, the coaxial shafts having a pair of spaced apart nonmagnetically permeable insulator shaft sections; magnetically permeable bearings to support each shaft; pole piece elements to provide radial gaps within the inner or outer shaft surfaces; ferrofluid disposed in the radial gaps to provide a seal apparatus for the shafts of designed pressure capacity; and a single radially polarized permanent magnet to provide a source of magnetic flux for the seal apparatus.

7 Claims, 1 Drawing Figure

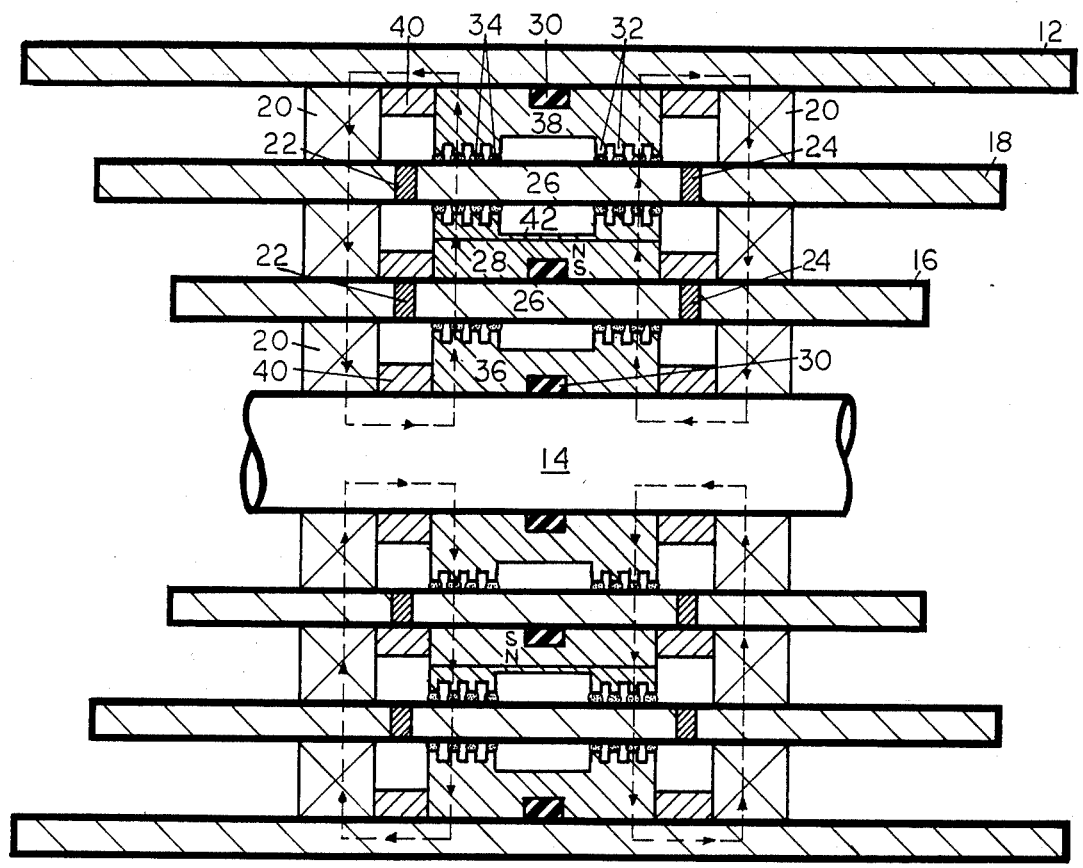

COAXIAL, MULTIPLE-SHAFT FERROFLUID SEAL APPARATUS

BACKGROUND OF THE INVENTION

Ferrofluid seals for the sealing of single rotary shafts either through the use of a single- or multiple-stage ferrofluid O-ring seal is a well founded and accepted technology. The effective sealing of two or more coaxial shafts in a single housing is quite difficult. Historically the solution to coaxial shaft sealing has been to mount physically one complete seal assembly inside another in order to de-couple the multiple magnetic structures. This approach to ferrofluid sealing of coaxial multiple shafts leads to an excessively large overall assembly which is quite cumbersome, particularly in use in small coaxial shaft diameters. Ferrofluid seals on coaxial, multiple-shaft elements are most desirable since such ferrofluid seals reduce wear on the sealing elements, provide for low drag torque, and may be designed for long ferrofluid seal life.

Typically, coaxial, multiple-shaft apparatus requiring effective sealings are used, for example, in semiconductor processing equipment, such as in sputtering assemblies for the etching or depositing onto a semiconductive wafer, and wherein a shutter, that is a plate with a hole, must be rotated to open and expose a target to a semiconductive wafer on a rotatable table below the target so that the rotating shutter is between the target and the table with the waffer. Another application for coaxial, multiple-shaft devices is for sample manipulation in certain high-vacuum analysis equipment, such as a goniometer, or for the use of x-ray equipment for crystallographic studies. Coaxial seals may be used with other devices wherein an effective seal is required, typically between a subatmospheric and an atmospheric or superatmospheric environment, and the seal is required between coaxial, multiple-shaft elements extending between the environments.

Thus, a seal apparatus for the hermetic sealing of the rotary motion of two or more coaxial shaft elements and for the independent rotation of the shafts in a low cost, compact design employing a ferrofluid seal is desirable.

SUMMARY OF THE INVENTION

The invention relates to a coaxial, multiple-shaft ferrofluid seal apparatus and the method of manufacture and use of such apparatus employing a radially polarized permanent magnet. In particular, the invention concerns a coaxial, multiple-shaft ferrofluid seal apparatus and wherein a single radially polarized magnetic strucure is employed to provide for multiple ferrofluid O-ring seals about the coaxial shafts in the seal apparatus.

The coaxial, multiple-shaft ferrofluid seal apparatus of the invention provides a multiple-shaft coaxial unit with a single radially polarized magnetic structure or a single source of magnetic flux for all of the sealing elements within the seal apparatus. The employment of a single annular permanent magnet as a common source of magnetic flux for all ferrofluid seals eliminates the need for multiple magnetic structures and the magnetic shielding between them which is required in the prior art, which requirements are common when mounting one seal inside another in a concentric manner. In addition, the coaxial, multiple-stage seal apparatus employs at least one magnetically permeable coaxial shaft element which includes, and is characterized by, at least one, preferably two, spaced apart shaft section or insert composed of a nonmagnetically permeable material, such as, for example, bronze or stainless steel series 300, and which is positioned between magnetically permeable shaft sections composed of a magnetical material, such as stainless steel series 400. The coaxial shaft element composed of the magnetically and nonmagnetically shaft sections is designed to permit the magnetic flux from the common magnet source to flow in the desired magnetic flux path and to provide one, or preferably two, close flux loops, so as to retain the ferrofluid as a liquid ferrofluid O-ring seal about one or more coaxial shafts.

The central shaft employed in this seal apparatus is composed of a magnetically permeable material so the flux lines may pass through the shaft element to complete and close the magnetic flux circuit. Where the central shaft is composed of a nonmagnetically permeable material, then a magnetically permeable pole block structure statically sealed to the central shaft is employed in order to complete the close magnetic flux circuit or a portion of the central shaft length is composed of a magnetically permeable material to close this magnetic loop.

Generally, the sealed shafts are composed within a magnetically permeable housing to provide a return path for the flux, or where a nonmagnetically permeable housing is employed, then the housing must include a magnetically permeable structure secured to the interior wall surface of the housing. The common magnetic source is composed of an annular radially polarized permanent magnet and an annular magnetically permeable, e.g. metal, insert or sleeve secured to the outer diameter of the radially polarized magnet and in a magnetic flux relationship with the permanent magnet. The insert at each end of the outer diameter extends into a close, noncontacting relationship with the inner surface of a coaxial shaft element and with the magnetically permeable shaft section of the shaft element to form at least one, and preferably a plurality of radial gaps wherein ferrofluid may be retained therein to provide a ferrofluid O-ring seal with the inner surface of the coaxial shafts. The annular insert is secured to and about the outer or inner diameter of the radially polarized magnet, while the permanent magnet is statically secured and sealed to the inner or outer diameter of a coaxial shaft.

The ferrofluid seal apparatus also comprises a plurality of magnetically permeable bearing means, such as ball bearing means, generally a pair for each shaft and on either side of the permanent magnet to provide support for the independent rotary motion of the central and the coaxial shafts and for providing a flux path for the magnetic flux circuit. The common permanent magnet of the magnet source may be comprised of any magnetic material, for example an Alnico #5 or a Sm-Co magnetic metal, or other strongly magnetic material. The ferrofluid is typically ferrofluid which is generally employed for vacuum-type operation and may range from about 100 to 450 cps at 27° C. and typically from 300 to 400 cps and having a saturation magnetization, for example of 200 to 1000 gauss, and generally 300 to 450 gauss. The ferrofluid seals formed about the central shaft and/or the coaxial shaft element may be typically exclusion seals, that is single-stage seals on each pole piece, but more typically and preferably, are multiple-stage seals of defined pressure capacity, e.g. greater than 15 psi, that is a plurality of separate, spaced apart, separate ferrofluid O-ring seals under each insert or pole block structure and formed by a plurality of knife edges or ridges either in the other end of the insert or structure or on the magnetically permeable section of the shaft or the pole block (see for example the Rosenswing patent relating to multiple-stage seals, U.S. Pat. No. 3,620,584, issued Nov. 16, 1971, hereby incorporated by reference).

The coaxial, multiple-stage seal apparatus of the invention thereby provides for hermetic sealing by the employment of ferrofluid O-rings for the rotary motion of two or more coaxial shafts in the seal apparatus and also provides for the independent rotation of the shaft in a compact design. The seal apparatus of the invention is particularly useful in semiconducting processing equipment wherein the central and coaxial shafts extend into a subatmospheric environment to provide for separate rotary motion within that environment of the central and coaxial shafts.

In one embodiment the coaxial, multiple-stage seal apparatus of the invention comprises a central magnetically permeable shaft and a magnetically permeable housing both to provide for the return path for the magnet flux circuit. The central shaft is surrounded by one or more coaxial shafts, which coaxial shafts are each characterized by a central magnetically permeable section and nonmagnetically permeable inserts or insulators on either side of the central section and magnetically permeable sections on each side of the inserts or insulators so that the central and other magnetically permeable coaxial shaft sections may serve as a magnetic flux path. The seal apparatus includes an annular radially polarized permanent magnet statically sealed and secured to the inner or outer diameter of a coaxial shaft and includes an inner magnetically permeable insert secured to the other inner or outer diameter of the permanent magnet. The insert includes raised sections at each end to act as pole pieces which extend into a close, noncontacting relationship with the surface of the coaxial shaft. Typically, the end pole pieces having a plurality of ridges or knife-like edges to form a multiple stage ferrofluid seal. A magnetically permeable pole block structure also with raised ends to act as pole piece elements is statically sealed and secured to the central shaft and to and about each of the coaxial shafts to be sealed and to the interior surface of the housing to form corresponding multiple-step seals between the inner surface of the first coaxial shaft and the outer surface of the largest coaxial shaft in the housing. The coaxial shafts are supported by a pair of magnetically permeable rotary bearings such as ball bearings on either side of the permanent magnet and the pole blcok structures to provide a magnetic flux path through the bearings. The bearings are magnetically insulated by the use of annular ring-like nonmagnetically permeable spaces adjacent to each side of the permanent magnet and the pole block structures.

In the seal apparatus, the magnetic flux path may be on only one side, but preferably on both sides of the permanent magnet to form two separate closed-loop flux circuits. The magnetic flux circuit passes from the single radially polarized permanent magnet secured, for example to the outer surface of the first coaxial shaft, through the raised sections of the insert, the ferrofluid O-ring, the central magnetically permeable shaft section, the ferrofluid O-ring on the outer diameter of the second coaxial shaft, the one leg or pole piece of the pole block structure, through the housing and returning through the insulated bearing to the central shaft and back to the permanent magnet through the pole block structure on the central shaft and the ferrofluid O-rings on the inner surface of the first coaxial shaft.

The coaxial seal apparatus of the invention provides a compact, lightweight seal apparatus wherein the shafts may run at different speeds and directions relative to one another. An advantage of the seal apparatus is that ferro lubricants may be used to lubricate the bearings which results in a reduction in contaminants entering the protected vacuum system and low drag for the seal operation.

The invention will be described for the purposes of illustration only in connection with certain illustrative embodiments; however, it is recognized that various changes, additions and improvements may be made by those persons skilled in the art all falling within the spirit and scope of the invention.

BRIEF DESCRIPTION OF THE DRAWINGS

The drawing is a sectional, schematic illustration of a coaxial ferrofluid seal apparatus of the invention.

DESCRIPTION OF THE EMBODIMENTS

The drawing is directed toward a coaxial ferrofluid seal apparatus 10 of the invention, which shows a magnetically permeable central shaft 14 surrounded by magnetically permeable coaxial shafts 16 and 18 within a magnetically permeable housing 12, with each shaft supported by a pair of magnetically permeable ball bearings 20, so that each shaft 14, 16 and 18 are capable of independent rotation, direction and speed.

The coaxial shafts 16 and 18 are characterized by a pair of magnetically insulating shaft inserts or sections 22 and 24 of a nonmagnetically permeable material to define a central magnetically permeable shaft section 26 in between. Coaxial shaft 16 includes a radially polarized permanent magnet 28 statically secured and sealed by an O-ring seal 30 to the outer surface and includes a magnetically permeable thin annular sleeve 42 secured to the free pole piece with dual raised elements on each side having a plurality of spaced apart raised ridges thereon which extend into a close, noncontacting relationship to form radial gaps, e.g. 2-6 mils, with the inner wall surface of coaxial shaft 18. Ferrofluid 32 and 34 in the radial gaps forms a plurality of separate O-ring seals within the inner wall surface of the coaxial shaft 18. Pole block structures 36 and 38 composed of a magnetically permeable material are statically secured by elastomeric O-ring seals 30 to and about the outer surface of the central shaft 14, and the inner wall of housing 12. The pole block structures have raised pole piece ends like the sleeve 42 to form a plurality of separate radial gaps with ferrofluid 32 and 34 to form a plurality of ferrofluid O-ring seals with the inner wall surface of coaxial shaft 16 and with the outer surface of shaft 18. Annular nonmagnetically permeable spacers 40 are placed adjacent to the bearings 20 to insulate magnetically the bearings 20. The coaxial shaft inserts 22 are positioned between the bearings 20 and the permanent magnet 28 and the pole blocks 36 and 38.

The seal apparatus 10 is a compact seal apparatus which has a simple source of magnetic flux. The two magnetic flux paths on either side of the single permanent magnet are illustrated by the dotted lines of the drawing. Ferrofluid, i.e. ferro lubricant, is used in the bearings 20. This embodiment has been illustrated with the use of two coaxial shafts about a central shaft; however, it is applicable to a plurality of coaxial shafts.

As illustrated by the described embodiments of the invention, effective hermetic ferrofluid sealing of the rotary motion of two or more coaxial shafts is provided from its independent rotations of the shafts together with a compact design employing a single radially polarized magnetic structure with a magnetically permeable central shaft. The multiple, coaxial shaft ferrofluid seal apparatus provides for reduced wear on the sealing elements, employs a single magnetic structure, and provides for long seal life and a compact design.

What is claimed is:

1. A coaxial, multiple-shaft radially polarized ferrofluid seal apparatus, which apparatus comprises:
   (a) a magnetically permeable housing for the seal apparatus;
   (b) a magnetically permeable central shaft element extending in the housing;
   (c) a one or more spaced apart magnetically permeable coaxial shaft elements about the central shaft element, and each coaxial shaft including first and second spaced apart nonmagnetically permeable shaft sections to define a magnetically permeable central section there between;
   (d) a radially polarized annular permanent magnet means secured to one of the coaxial shafts to provide a source of magnetic flux;
   (e) a thin magnetically permeable annular sleeve means secured to one radially polarized surface of the permanent magnet to form one or more radial gaps with a surface of a coaxial shaft element;
   (f) pole block means comprising a magnetically permeable block element which includes at least first and second pole block means having spaced apart raised pole piece at the one and other axial end to form a plurality of radial gaps under each pole piece with a surface of a shaft element, the first pole piece means secured to the housing and the second pole piece means secured to the central shaft;
   (g) a pair of magnetically permeable bearing means for each shaft to support the central and coaxial shaft elements, the bearing means disposed on either side of the permanent magnet means;
   (h) nonmagnetically permeable annular insulating means to insulate magnetically each of the bearing means from the permanent magnet means and each of the pole block means, the insulating means radially aligned with the first and second shaft sections; and
   (i) ferrofluid in the radial gaps to form a plurality of ferrofluid O-ring seals under each pole piece and sleeve means and to provide for the sealing of the coaxial shaft elements whereby the magnetic flux from the permanent magnet passes in a closed circuit through the housing, the bearing means, the central shaft, the pole block means, the sleeve means, the central shaft sections, the ferrofluid in the radial gaps; and the radially polarized permanent magnet means.

2. The seal apparatus of claim 1 which includes first and second magnetically permeable bearing means for each shaft element on either side of the permanent magnet means and pole block means to provide two separate closed-loop magnetic flux circuits from the single permanent magnet means.

3. The seal apparatus of claim 2 wherein the pole block means and the sleeve means include two spaced apart raised pole piece elements, each having a plurality of edges to form a plurality of radial gaps so to form a plurality of separate ferrofluid O-ring seals under each pole piece to provide a seal apparatus of a defined pressure capacity.

4. The seal apparatus of claim 1 wherein the permanent magnet means is statically sealed and secured to an outer surface of a coaxial shaft element.

5. The seal apparatus of claim 1 where one pole block means is sealed and secured to an inner surface of the housing to form one or more radial gaps with an outer wall surface of the largest diameter coaxial shaft element.

6. The seal apparatus of claim 1 wherein one of the pole block means is sealed and secured to the outer surface of the central shaft element to form one or more radial gaps with an inner wall surface of the smallest diameter coaxial shaft element.

7. The seal apparatus of claim 1 wherein the insulating means and nonmagnetically permeable shaft sections are radially aligned to insulate magnetically the bearing means.

* * * * *